(12) United States Patent
Cideciyan et al.

(10) Patent No.: US 7,813,070 B2
(45) Date of Patent: Oct. 12, 2010

(54) ERROR CORRECTION CAPABILITY FOR LONGITUDINAL POSITION DATA IN A TAPE STORAGE SYSTEM

(75) Inventors: Roy D. Cideciyan, Rueschlikon (CH); Evangelos S. Eleftheriou, Rueschlikon (CH); Paul J. Seger, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 414 days.

(21) Appl. No.: 12/033,440

(22) Filed: Feb. 19, 2008

(65) Prior Publication Data

US 2009/0207515 A1    Aug. 20, 2009

(51) Int. Cl.
*G11B 5/09* (2006.01)

(52) U.S. Cl. ..................................... 360/53
(58) Field of Classification Search ............. 360/53, 360/77.12, 31, 48, 78.02; 714/755, 764, 714/771; 386/46, 68, 78, 95, 103, 124
See application file for complete search history.

(56) References Cited

U.S. PATENT DOCUMENTS

| | | | | |
|---|---|---|---|---|
| 4,630,272 A | * | 12/1986 | Fukami et al. | 714/755 |
| 4,688,225 A | * | 8/1987 | Fukami et al. | 714/755 |
| 4,768,108 A | * | 8/1988 | Higurashi | 386/103 |
| 4,866,636 A | * | 9/1989 | Fukami et al. | 708/203 |
| 4,975,915 A | * | 12/1990 | Sako et al. | 714/755 |
| 5,355,132 A | * | 10/1994 | Kani et al. | 341/55 |
| 5,394,277 A | * | 2/1995 | Pahr et al. | 360/53 |
| 5,568,327 A | * | 10/1996 | Pahr et al. | 360/53 |
| 5,666,461 A | * | 9/1997 | Igarashi et al. | 386/95 |
| 5,796,912 A | * | 8/1998 | Sato | 386/96 |
| 5,802,243 A | * | 9/1998 | Yao et al. | 386/78 |
| 6,005,727 A | | 12/1999 | Behrens et al. | |
| 6,031,959 A | * | 2/2000 | Hamai et al. | 386/68 |
| 6,101,313 A | * | 8/2000 | Igarashi et al. | 386/95 |
| 6,462,898 B2 | | 10/2002 | Blaum et al. | |
| 6,631,492 B2 | * | 10/2003 | Marchant | 714/764 |
| 6,791,781 B2 | | 9/2004 | Bui et al. | |
| 6,947,663 B1 | * | 9/2005 | Koda et al. | 386/124 |
| 7,239,794 B2 | * | 7/2007 | Koda et al. | 386/46 |
| 7,317,864 B2 | * | 1/2008 | Koda et al. | 386/46 |
| 7,421,640 B2 | * | 9/2008 | Cideciyan et al. | 714/771 |
| 2007/0014042 A1 | | 1/2007 | Nylander-Hill et al. | |
| 2007/0044007 A1 | | 2/2007 | Cideciyan et al. | |
| 2007/0074024 A1 | * | 3/2007 | Cheong et al. | 713/171 |

(Continued)

*Primary Examiner*—Fred Tzeng
(74) *Attorney, Agent, or Firm*—Dan Shifrin

(57) ABSTRACT

A longitudinal position (LPOS) word L(n) is encoded with error correction capability. The LPOS word includes a plurality of LPOS symbols $L0(n)$ through $Lk(n)$ calculated as $$L(n) = \sum_{i=0}^{5} L_i(n) 14^i$$

and representing a longitudinal position of a magnetic tape relative to a tape head in a tape storage system. A word type is determined in response to at least one of the plurality of LPOS symbols and, in response to the determined word type, at least one formatted symbol F(n) is generated from the plurality of LPOS symbols L(n). At least one parity symbol P(n) is generated from the formatted symbol F(n). The formatted and parity symbols are communicated to a servo channel of the tape storage system to be recorded onto a servo track of the magnetic tape. Adding redundancy to LPOS words provides the capability of correcting multiple bit errors without increasing the LPOS word length.

21 Claims, 9 Drawing Sheets

U.S. PATENT DOCUMENTS

2008/0056409 A1* 3/2008 Koda et al. .................. 375/316
2008/0056685 A1* 3/2008 Koda et al. .................. 386/124
2008/0080833 A1* 4/2008 Koda et al. .................... 386/46

* cited by examiner

Sliding-Block Deformatter for Forward Tape Motion

FIG. 11

Sliding-Block Deformatter for Reverse Tape Motion

ERROR CORRECTION CAPABILITY FOR LONGITUDINAL POSITION DATA IN A TAPE STORAGE SYSTEM

TECHNICAL FIELD

The present invention relates generally to providing longitudinal position data (LPOS) in a tape storage system and, in particular, to providing error correction capability to LPOS data.

BACKGROUND ART

Tape storage systems remain the most efficient and cost-effective means for providing data backup because no other storage technology offers the same low cost and high capacity combined advantage. In addition, tape storage systems have been proven to be very reliable.

By combining the advantages of linear multi-channel bi-directional tape formats in common usage, Linear Tape-Open (LTO) technology has been developed to maximize capacity and performance of tape storage systems. LTO tapes use a tape format that has longitudinally pre-written servo tracks. The servo tracks provide a timing-based track-following position error scheme. The servo tracks contain a repeated pattern of recorded flux transitions that occur in grouped bursts of 5, 5, 4 and 4 transitions. The timing between the sets of five-bursts and between sets of four-bursts provides the position information for track following. Additionally, the individual transitions within the five-bursts are phase-shifted in a manner that encodes longitudinal position information (LPOS) into the servo tracks.

The LPOS information is used to keep track of the longitudinal position of data records written onto or read from a tape and is used to locate those data records when the reading or writing process temporarily stops. By detecting the phase-encoded LPOS information, a tape storage system is able to determine the tape position relative to landmarks lengthwise down a tape. The LPOS locations of data files on tape are also stored in the volume control data for use to locate the data files during a later tape cartridge load for reading or for write-appending new files onto the end of the last file written to the tape. The LPOS data is used as the primary positional information for the tape storage servo control system to determine the starting and stopping of a tape and to back-hitch the tape in order to position the read-write heads at the beginning of a data record at the required velocity and track position that allows the start of a new data transfer operation.

LPOS data typically are unable to tolerate any errors. But if a tape drive is reduced to a single servo channel because other servo heads have been smeared or shorted, a single bit error on that channel can cause a Stop Write condition. Thus, the LPOS data has to be able to tolerate some level of errors such that the system can continue to operate with just one good servo head after the occurrence of an error.

One proposed solution to the above-mentioned problem is to append Reed-Solomon parity symbols to an LPOS word. However, the appended parity symbols would increase the length of the LPOS word and would cause problems in synchronizing to the LPOS word because Reed-Solomon words are not base-14 as required by the LTO LPOS format standard in order to allow for synchronization. Another suggested solution would add a base-14 checksum to the LPOS word. But again, this would increase the length of the LPOS word and only provide error detection but not error correction.

Still another solution is proposed in co-pending and commonly-assigned U.S. application Ser. No. 11/205,713 entitled METHOD AND APPARATUS FOR PROVIDING ERROR CORRECTION CAPABILITY TO LONGITUDINAL POSITION DATA, which application is incorporated herein by reference in its entirety. The method and apparatus proposed in the '713 application can detect and correct a one-bit error in an LPOS word.

One proposed technique of providing multi-bit error correction is to use error control coding to compute redundant bits which are then appended to the LPOS word without lengthening the word. However, such a technique reduces the resolution of the LPOS word by reducing the number of bits in the word dedicated to position information.

SUMMARY OF THE INVENTION

The present invention provides a method for encoding a longitudinal position (LPOS) word L(n) with error correction capability. The LPOS word includes a plurality of LPOS symbols $L0(n)$ through $Lk(n)$ calculated as $$L(n) = \sum_{i=0}^{5} L_i(n) 14^i$$

and representing a longitudinal position of a magnetic tape relative to a tape head in a tape storage system. The method comprises determining a word type in response to at least one of the plurality of LPOS symbols and, in response to the determined word type, generating at least one formatted symbol F(n) from the plurality of LPOS symbols L(n). The method further comprises generating at least one parity symbol P(n) from the formatted symbol F(n) and communicating LPOS data to a servo channel of the tape storage system to be recorded onto a servo track of the magnetic tape, the LPOS data comprising the at least one formatted symbol F(n) and the at least one parity symbol P(n). The present invention also provides computer program product of a computer readable medium usable with a programmable computer and having computer-readable code embodied therein for decoding an encoded longitudinal position (LPOS) word L(n) recorded on a magnetic tape and representing a longitudinal position of the magnetic tape relative to a tape head in a tape storage system. The computer-readable code comprises instructions for performing the steps of the forgoing method.

The present invention further provides an encoder operable to encode an longitudinal position (LPOS) word with error correction capability. The encoder comprises a word type generator operable to determine a word type in response to at least one of the plurality of LPOS symbols and a format symbol generator operable to generate at least one formatted symbol F(n) from the plurality of LPOS symbols L(n) in response to the determined word type. The encoder further comprises a parity symbol generator operable to generate at least one parity symbol P(n) from the formatted symbol F(n) and a servo channel operable to transmit LPOS to be recorded onto a servo track of the magnetic tape, the LPOS data comprising the at least one formatted symbol F(n) and the at least one parity symbol P(n).

The present invention also provides a tape storage system having error correction capability for longitudinal position (LPOS) words. The system comprises a servo channel operable to reproduce a recorded encoded LPOS word, including a reproduced formatted symbol F(n) and at least one reproduced parity symbol P(n), from the magnetic tape and a decoder operable to decode the encoded LPOS word. The decoder comprises a decoder operable to generate at least one decoded symbol F"(n) from the least one reproduced parity symbol P(n) and the formatted symbol F(n), a word type decoder operable to determine the word type of the encoded LPOS word, and a deformatter operable to generate a deformatted LPOS word L"(n) representing the longitudinal position of the magnetic tape relative to the tape head in response to the determined word type.

DETAILED DESCRIPTION OF THE PREFERRED EMBODIMENT

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module of executable code may, for instance, comprise one or more physical or logical blocks of computer instructions which may, for instance, be organized as an object, procedure, or function. A module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and may exist, at least partially, merely as electronic signals on a system or network.

Furthermore, the described features, structures, or characteristics of the invention may be combined in any suitable manner in one or more embodiments. In the following description, numerous specific details are provided, such as examples of programming, software modules, hardware modules, hardware circuits, etc., to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1:
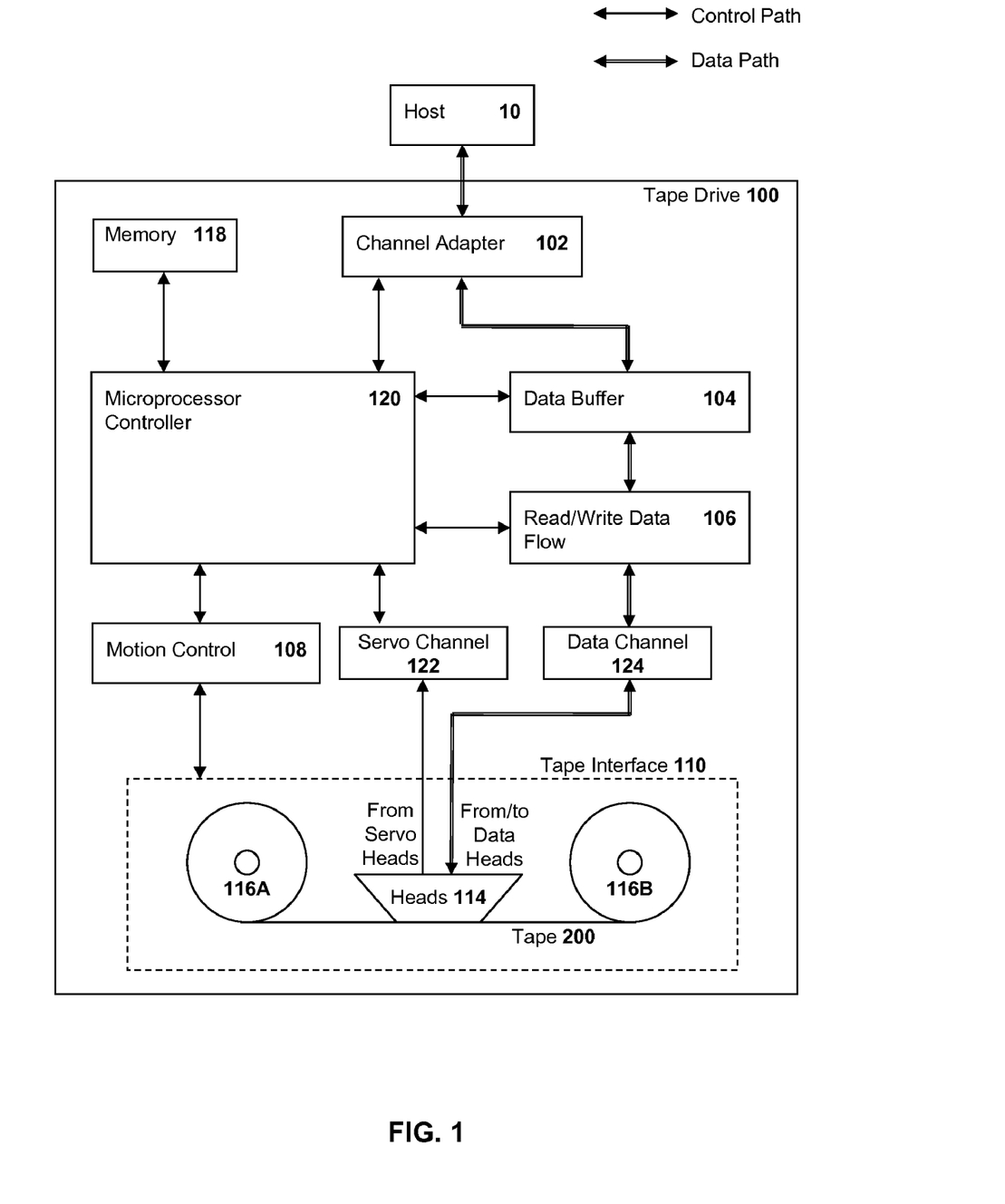
FIG. 1 is a block diagram of a magnetic tape drive in which the present invention may be incorporated.

FIG. 1 is a block diagram of a magnetic tape drive 100 in which the present invention may be incorporated. The tape drive 100 is coupled to a host device 10 through a channel or host adapter 102 from which the drive 100 receives data to be stored to, and transmits data read from, magnetic tape 200. The tape drive 100 further includes a data path and a control path. The data path includes a data buffer 104, coupled to receive data from and send data to the adapter 102, and a read/write data flow module 106, coupled between the buffer 104 and a data channel 124 coupled to a tape interface module 110. The control path includes a microprocessor controller 120, coupled to receive control signals from, and send control and response signals to, the host device 10 through the adapter 102, a motion control module 108, coupled between the microprocessor controller 120 and the tape interface system 110, and a memory 118 in which instructions are stored to be executed by the microprocessor controller 120. The memory 118 may be integrated into the microprocessor controller 120 or may be a separate component, as illustrated in FIG. 1. The tape drive 100 further includes a servo channel 122, also coupled to the microprocessor controller 120, through which servo information including LPOS data is read from the tape 200.

The microprocessor controller 120 provides overhead control functionality for the operations of all other components of the tape drive 100. The functions performed by the microprocessor controller 120 are programmable via microcode routines, as is known in the art. During data write operations (with all dataflow being reversed for data read operations), the microprocessor controller 120 activates the adapter 102 to perform the required host interface protocol for receiving an information data block. The adaptor 102 communicates the data block to the data buffer 104 which stores the data for subsequent read/write processing. The data buffer 104 in turn communicates the data to the read/write dataflow module 106, which formats the device data into physically formatted data that may be recorded on the magnetic tape 200. The read/write dataflow module 106 is also responsible for executing all read/write data transfer operations under the control of the microprocessor controller 120. Formatted physical data from the read/write dataflow module 106 is communicated to a tape interface module 110 which includes one or more read/write heads within a head assembly 114 and appropriate drive components (not shown) for performing forward and reverse movement of the tape 200 mounted on supply and take-up reels 116A and 116B. The drive components are controlled by the motion control module 108 to execute such tape movements as forward and reverse recording and playback, rewind and other tape motion functions. In addition, in multi-track tape drive systems, the motion control module 108 positions the read/write heads transversely relative to the longitudinal direction of tape movement in order to record/read data in/from a plurality of tracks.

High density multi-track recording may be accomplished by recording multiple data tracks onto the tape 200 using a plurality of small head elements incorporated into the head assembly 114, with each data track being written by one head element (i.e., read/write head channel). This data storage protocol is achieved using multiple tape wraps and tape wrap halves. A tape wrap consists of one outbound and one inbound recording/playback pass across the entire allocated length of the tape 200. The outbound pass represents a first wrap half while the inbound pass represents a second wrap half. There are typically multiple wraps recorded on the tape 200. Each wrap half extends across the entire usable portion of the tape 200.

Figure 2:
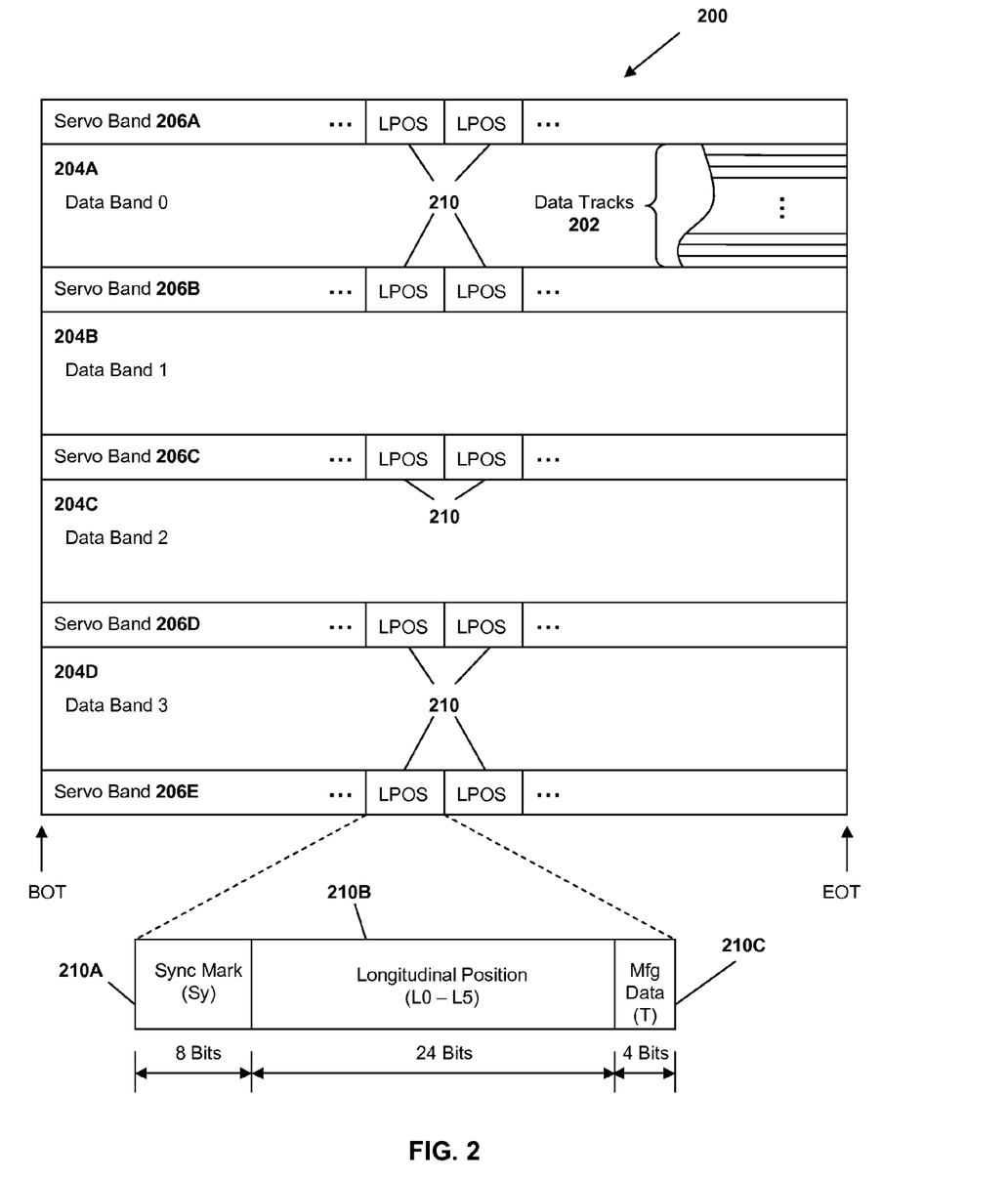
FIG. 2 schematically represents the format of magnetic tape media which may be used in the drive of FIG. 1.

FIG. 2 illustrates the manner in which the tape 200 may be formatted. A set of data tracks 202 is recorded on each of a plurality of data bands which extend the length of the tape 200 from the beginning (BOT) to the end (EOT). The tape 200 illustrated in FIG. 2 is shown to have four data bands 204A, 204B, 204C, 204D. It will be appreciated that a tape may have more or fewer bands and the present invention is not limited to use with tape having any particular number of data bands. Servo bands 206B, 206C, 206D separate the data bands 204A, 204B, 204C, 204D; additional servo bands 206A, 206E are formatted along the two edges of the tape 200. Again, the number servo bands illustrated in FIG. 2 is merely representative and not meant to be limiting. A periodic servo pattern is recorded on the servo bands 206A, 206B, 206C, 206D, 206E by the tape manufacturer to be read by servo elements in the head assembly 114 to assist in maintaining proper head alignment relative to the tape 200.

For accurate longitudinal positioning of the tape 200 relative to the head assembly 114, the servo pattern is encoded with longitudinal position (LPOS) words 210 which represents an absolute longitudinal address that appears at set intervals along the length of the tape 200. In the LTO ("Linear Tape-Open") tape format, a unique LPOS word 210 occurs every 7.2 mm along the tape 200. Thus, the drive can position the tape longitudinally to a given LPOS to obtain a resolution of 7.2 mm.

As further illustrated in FIG. 2, an LPOS word in the LTO format includes an 8-bit sync mark (Sy) 210A, a 24-bit field 210B containing position information (L0-L5) and a 4-bit field containing manufacturer's data (T). Within the 24-bit position information field 210B, L0 represents the least significant 4-bit symbol of the longitudinal position and L5 represents the most significant symbol of the longitudinal position. According to the LTO 1-4 format standard, each digit $L_i(n)$ of the LPOS word is from a 14-ary alphabet. The LPOS value is determined as:

$$L(n) = \sum_{i=0}^{5} L_i(n) 14^i$$

LPOS word symbols are constructed from a set of bit sequences listed in Table I. The most significant bit within each LPOS word symbol is encoded into a servo subframe first. An LPOS word contains 36 bits and has a length of 36 servo frames. The sync mark Sy uniquely uses the bit sequences 1000 and 0000.

TABLE I

| Symbol | Bit Sequence |
|---|---|
| Sy | 1000 0000 |
| D | 0001 |
| C | 0010 |
| B | 0011 |
| A | 0100 |
| 9 | 0101 |
| 8 | 0110 |
| 7 | 0111 |
| 6 | 1001 |
| 5 | 1010 |
| 4 | 1011 |
| 3 | 1100 |
| 2 | 1101 |
| 1 | 1110 |
| 0 | 1111 |

In accordance with the present invention, different "types" of encoded LPOS words are generated. Differences of LPOS digits in a series of consecutive LPOS words are computed to determine the type of encoded LPOS word. Having identified the type of the LPOS word, the LPOS value can then be computed from the LPOS nibbles in multiple consecutive LPOS words. In one embodiment of the present invention, described in detail below, four types of encoded LPOS words are generated in a manner which is expected to allow correction of single, double and triple random errors and detection of quadruple random errors, thereby delivering the correct LPOS value for defect sizes up to 600 μm without increasing the length of the LPOS word or reducing its positioning resolution. The present invention is expected to correct either all single and double random errors or all single-burst errors with a burst size of up to 4 bits, thereby delivering the correct LPOS value for defect sizes up to 800 μm.

As noted above, one embodiment of the present invention (the D1 format) provides four types of 36-bit LPOS words having eight symbols which may be generalized as Sy, V(n), W(n), X(n), Y(n), $F_0(n)$, $F_1(n)$, T(n). $F_0(n)$ and $F_1(n)$ are selected from the six 4-bit LPOS symbols L0-L5. V(n), W(n), X(n) and Y(n) are 4-bit parity symbols calculated as described below. In order to avoid conflict with the sync mark 210A, which must be unique, the last bit of each parity symbol is always a 1. This, together with a systematic ECC encoder, ensures that the sync mark Sy cannot occur in the LPOS word other than at the beginning. In the D1 format, the parity symbols are generated based on either an (N=24, K=12) extended Golay code over the finite field GF(2) or an (N=8, K=4) singly extended Reed-Solomon (RS) code over the finite field GF(8).

Figure 3:
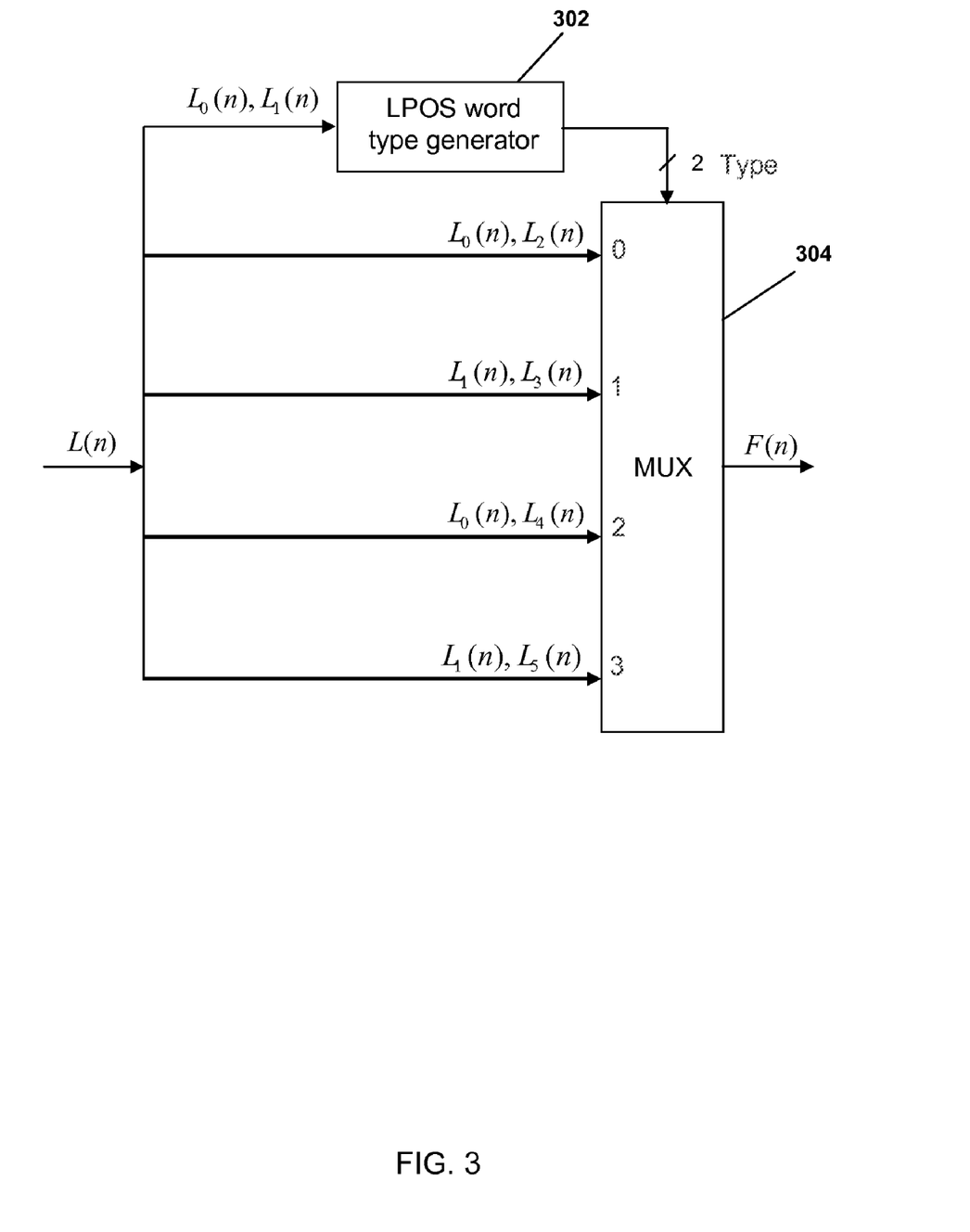
FIG. 3 illustrates an implementation of a block formatter of the present invention.

FIG. 3 is a block diagram of the modules used to determine which two input symbols L0-L5 are selected for the output F(n)=$F_0(n)$, $F_1(n)$. L1(n) and L0(n) are input to a word type generator 302. L0(n) and L2(n) are input to a first input of a multiplexer 304; L1(n) and L3(n) are input to a second input of the MUX 304; L0(n) and L4(n) are input to a third input of the MUX 304; and L1(n) and L5(n) are input to a fourth input of the MUX 304. The output of the word type generator 302 is communicated to the control input of the MUX 304 to determine the output of the MUX 304 as follows:

1) A Type 0 LPOS word comprising Sy, V(n), W(n), X(n), Y(n), L0(n), L2(n), T(n) is generated if (14 L1(n)+L0(n))≡0 mod 4;

2) A Type 1 LPOS word comprising Sy, V(n+1), W(n+1), X(n+1), Y(n+1), L1(n+1), L3(n+1), T(n+1) is generated if (14 L1(n+1)+L0(n+1))≡1 mod 4;

3) A Type 2 LPOS word comprising Sy, V(n+2), W(n+2), X(n+2), Y(n+2), L0(n+2), L4(n+2), T(n+2) is generated if (14 L1(n+2)+L0(n+2))=2 mod 4; and
4) A Type 3 LPOS word comprising Sy, V(n+3), W(n+3), X(n+3), Y(n+3), L1(n+3), L5(n+3), T(n+3) is generated if (14 L1(n+3)+L0(n+3))=3 mod 4.

In another embodiment, referred to as the D2 format, the parity symbols are generated based on either an (N=18, K=12) extended Hamming code or an (N=6, K=4) RS code over the finite field GF(8). The D2 format has four types of 24-bit LPOS words having six symbols which may be generalized as Sy, X(n), Y(n), $F_0(n)$, $F_1(n)$, T(n). $F_0(n)$ and $F_1(n)$ are selected from the six 4-bit LPOS symbols L0-L5 in a manner similar to the description of FIG. 3 above. Again, the output of the word type generator 202 is communicated to the control input of the MUX 204 to determine the output of the MUX 304 as follows:
1) A Type 0 LPOS word comprising Sy, X(n), Y(n), L0(n), L2(n), T(n) is generated if (14 L1(n)+L0(n))=0 mod 4;
2) A Type 1 LPOS word comprising Sy, X(n+1), Y(n+1), L1(n+1), L3(n+1), T(n+1) is generated if (14 L1(n+1)+L0(n+1))=1 mod 4;
3) A Type 2 LPOS word comprising Sy, X(n+2), Y(n+2), L0(n+2), L4(n+2), T(n+2) is generated if (14 L1(n+2)+L0(n+2))=2 mod 4; and
4) A Type 3 LPOS word comprising Sy, X(n+3), Y(n+3), L1(n+3), L5(n+3), T(n+3) is generated if (14 L1(n+3)+L0(n+3))=3 mod 4.

Figure 4:
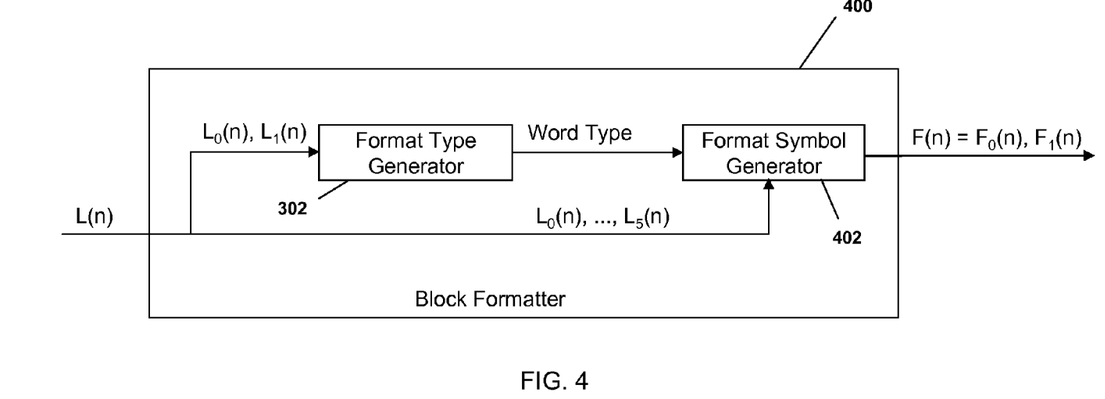
FIG. 4 is a block diagram of a block formatter of the present invention.

FIG. 4 is a block diagram of a block formatter 400 of the present invention which maps the 24 bits of position information at the input, L(n)=$L_0(n)$, $L_1(n)$, $L_2(n)$, $L_3(n)$, $L_4(n)$, $L_5(n)$, into the two 4-bit format symbols, F(n)=$F_0(n)$, $F_1(n)$. The formatter 400 includes the format or word type generator 302 to determine the word type from the first two position symbols $L_0(n)$, $L_1(n)$. The formatter 400 also includes a format symbol generator 402 which receives the word type from the format type generator 302 and the position symbols L(n) from the formatter input and generates the two formatter output symbols F(n)=$F_0(n)$, $F_1(n)$, each of which is from a 14-ary alphabet.

The following is an example of pseudocode in which the formatter 400 is implemented as a sliding block formatter:

```
Function GetType(L0, L1)
    ' Returns LPOS word type given L0 and L1 digits
    If ((L1 Mod 2) = 0) Then
        GetType = L0 Mod 4
    End If
    If ((L1 Mod 2) = 1) Then
        GetType = (L0 + 2) Mod 4
    End If
End Function
Function GetF0(L0, L1, L2, L3, L4, L5)
    ' Get sliding block encoder item F0 given L0 ... L5
    WordType = GetType(L0, L1)
    Select Case WordType
        Case 0
            GetF0 = L0
        Case 1
            GetF0 = L1
        Case 2
            GetF0 = L0
        Case 3
            GetF0 = L1
    End Select
End Function
Function GetF1(L0, L1, L2, L3, L4, L5)
    ' Get sliding block encoder item F1 given L1 .. L5
    WordType = GetType(L0, L1)
```

-continued

```
    Select Case WordType
        Case 0
            GetF1 = L2
        Case 1
            GetF1 = L3
        Case 2
            GetF1 = L4
        Case 3
            GetF1 = L5
    End Select
End Function
```

Figure 5:
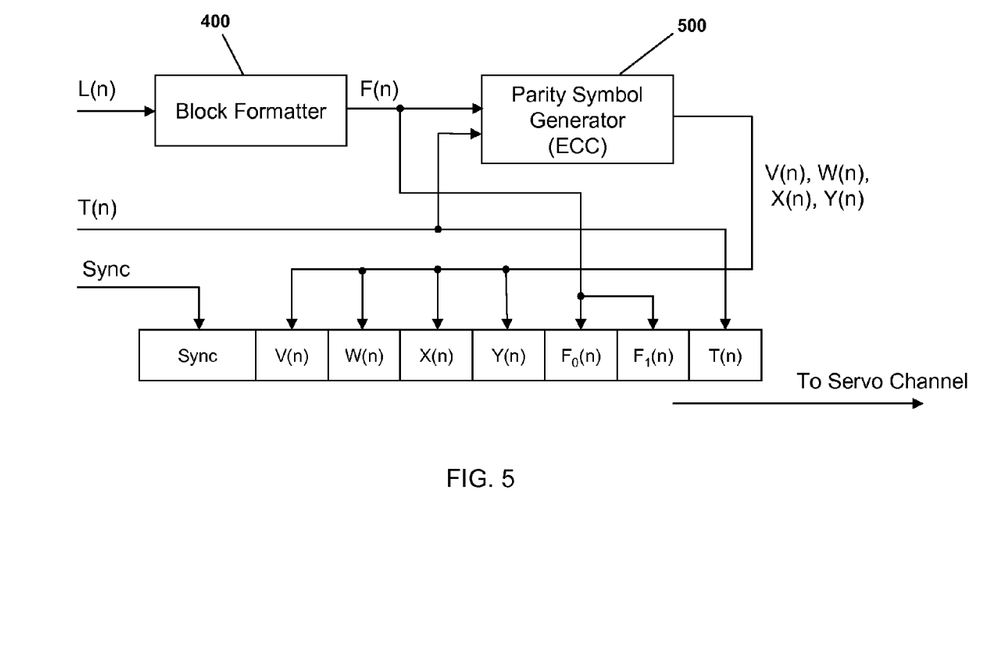
FIG. 5 illustrates the generation of an LPOS word in accordance with one method of the present invention.

FIG. 5 illustrates the generation of an LPOS word in accordance with the D1 format of the present invention. The output of the block formatter 400 and the manufacture's data symbol T(n) are input into a parity symbol (ECC) generator 500. The parity symbol generator 500 outputs four 4-bit parity symbols, V(n), W(n), X(n), Y(n). As will be described below, when the D2 format is used, the parity symbol generator 400 outputs two 4-bit parity symbols, X(n), Y(n). The four parity symbols are appended to the sync mark symbol, followed by the two formatter output symbols, $F_0(n)$, $F_1(n)$, followed by the manufacture's data symbol T(x). The resulting 36 bits are written to the tape 200 by a servo writer during tape manufacturing.

Figure 6A:
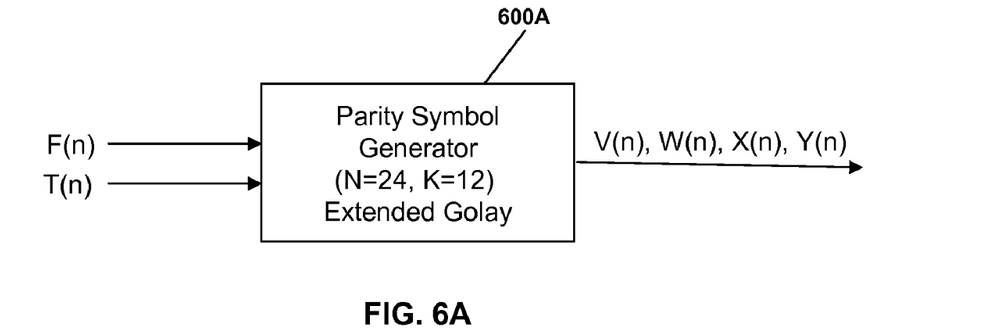
FIGS. 6A and 6B illustrate parity symbol generators which may be used to generate an LPOS word in accordance with the method of FIG. 4.
Figure 6B:
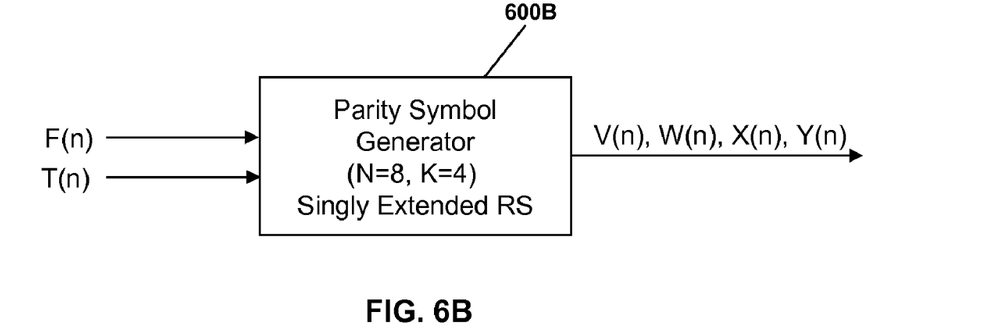

FIG. 6A represents a D1 format parity symbol generator 600A in which the four parity symbols V(n), W(n), X(n), Y(n) are generated from F(n) and T(n) using an (N=24, K=12) extended Golay code over GF(2). FIG. 6B represents a D1 format parity symbol generator 600B in which the four parity symbols are generated using an (N=8, K=4) singly extended Reed-Solomon code over GF(8).

Figure 7A:
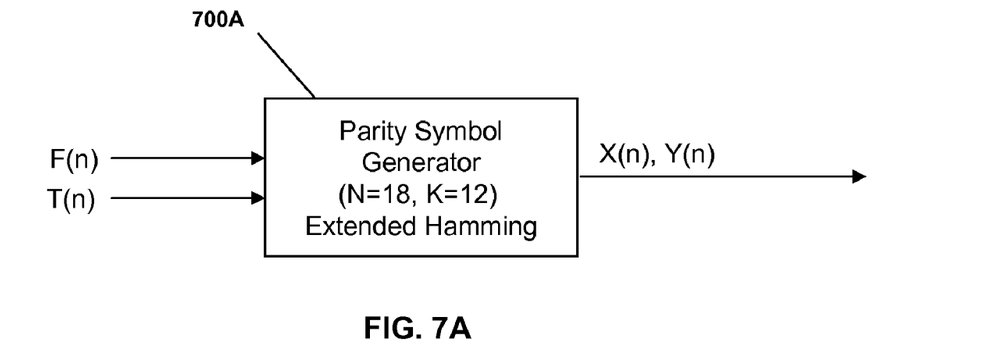
FIGS. 7A and 7B illustrate parity symbol generators which may be used to generate an LPOS word in accordance with another method of the present invention.
Figure 7B:
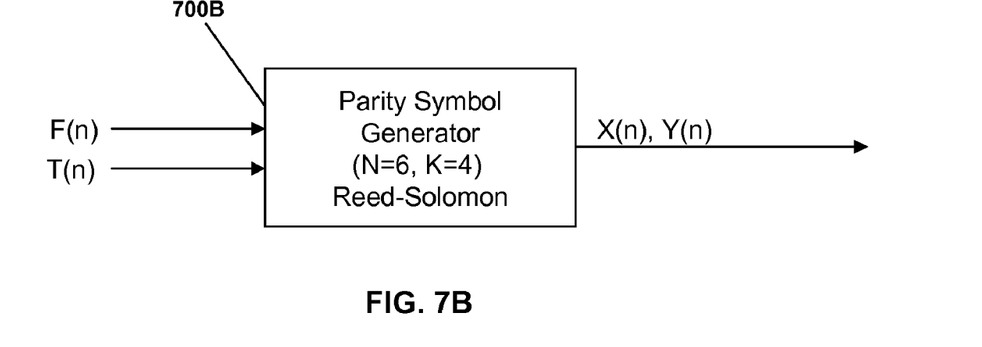

FIG. 7A represents a D2 format parity symbol generator 700A in which the two parity symbols X(n), Y(n) are generated from F(n) and T(n) using an (N=18, K=12) shortened extended Hamming code over GF(2). FIG. 7B represents a D2 format parity symbol generator 700B in which the two parity symbols are generated using an (N=6, K=4) Reed-Solomon code over GF(8).

The resolution of the D1 format is 7.2 mm, corresponding to 36 servo frames of 200 μm, and the resolution of the D2 format is 5.6 mm, corresponding to 28 servo frames of 200 μm. Therefore, the D2 format may be preferable whenever the higher resolution is desirable. Furthermore, the capabilities of the error correction schemes of both formats differ from each other. In the case of the D1 format, the (N=24,K=12) extended Golay code over GF(2) can correct 3 erroneous bits at random locations or a single error-burst spanning 3 bits of length 600 μm whereas the (N=8,K=4) singly extended RS code over GF(8) can correct either 2 erroneous bits at random locations or a single error-burst spanning 4 bits of length 800 μm. However, in the case of the D2 format, the (N=18,K=12) shortened extended Hamming code over GF(2) can correct 1 erroneous bit at a random location whereas the (N=6,K=4) RS code over GF(8) can correct either 1 erroneous bit at a random location or 1 erroneous 3-bit RS symbol of length 600 μm. Therefore, the D1 format with lower resolution may be preferable to the D2 format with higher resolution whenever a higher error correction capability is desired due to the occurrence of LPOS bit errors during LPOS detection.

Figure 8A:
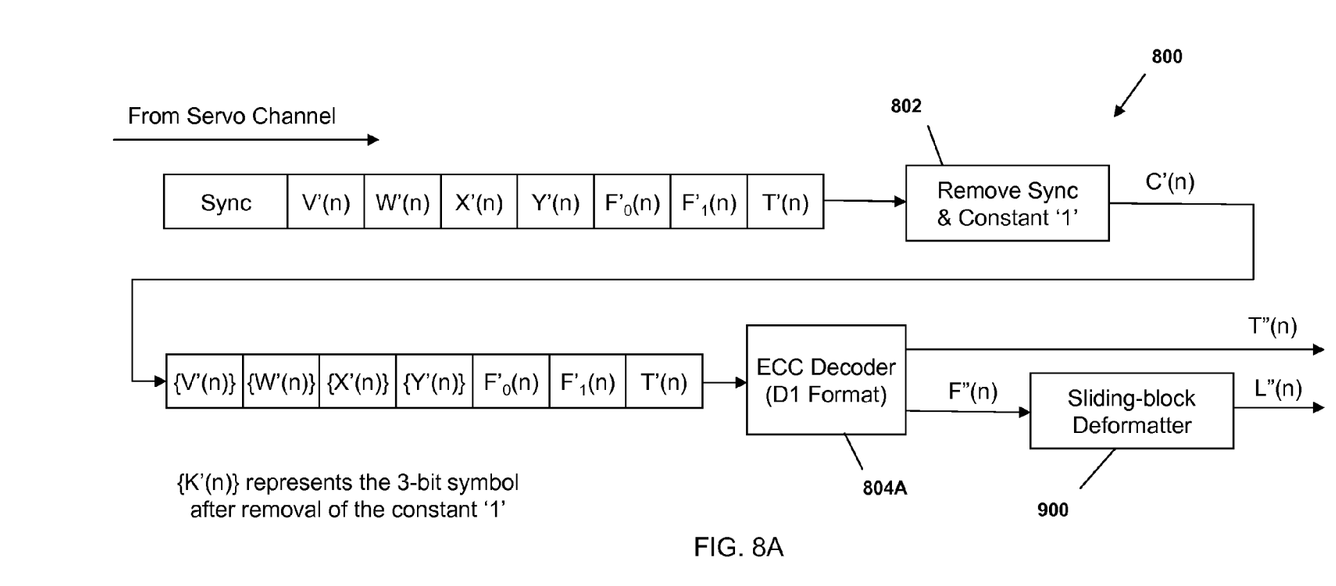
FIG. 8A illustrates a decoding process in accordance with one method of the present invention.
Figure 8B:
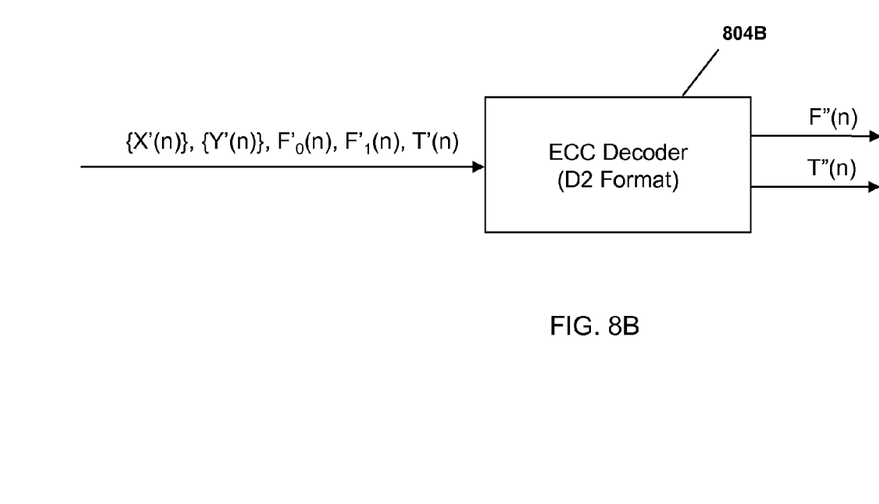
FIG. 8B illustrates a decoder which may be used in accordance with another method of the present invention.

When the servo elements of the tape heads 114 read data from the servo track, the formatted LPOS words must be decoded and deformatted. FIG. 8A is a block diagram of the modules 800 used to perform such functions when the LPOS words have been formatted with the D1 format. The modules 800 include a module 802 into which the LPOS words are input and which removes the sync mark from the word as well as the '1' from the last position in the received parity symbols V'(n), W'(n), X'(n), Y'(n). The remaining symbols, {V'(n)}, {W'(n)}, {X'(n)}, {Y'(n)}, F'$_0$(n), F'$_1$(n), T'(n), referred to collectively in FIG. 8A as C'(n) are input into an ECC decoder 804A where they are decoded. The decoder 804A outputs F"$_0$(n), F"$_1$(n), referred to collectively as F"(n), which are input into a sliding block deformatter 900, and T"(n). FIG. 8B illustrates a decoder 804B used when the LPOS words have been formatted with the D2 format. The decoder 804B receives the output {X(n)}, {Y(n)}, F'$_0$(n), F'$_1$(n), T'(n) from the module 802, decodes the symbols according to the D2 format and outputs F"(n) and T"(n). If the decoder 804A or 804B detects an error, an attempt is made to correct it; otherwise, the error is flagged. It is anticipated that the D1 format using the (N=24, K=12) extended Golay code will allow three bits in error or a burst of three bits (representing 0.6 mm of tape length) to be corrected. It is anticipated that the D1 format using the (N=8, K=4) singly extended RS code over the finite field GF(8) will allow two bits in error or a burst of four bits (representing 0.8 mm of tape length) to be corrected. It is anticipated that the D2 format based on either the (N=18, K=12) extended Hamming code or the (N=6, K=4) RS code over the finite field GF(8) will allow the correction of one erroneous bit at a random location (representing 0.2 mm of tape length). A great variety of algebraic decoding techniques for Golay, Hamming and RS codes are known that can be used to compute the error locations and the error values in {V'(n)}, {W'(n)}, {X'(n)}, {Y'(n)}, F'$_0$(n), F'$_1$(n), T'(n) in case of the D1 format and in {X'(n)}, {Y'(n)}, F'$_0$(n), F'$_1$(n), T'(n) in case of the D2 format. In general, ECC decoders may raise an error-detection flag if the received word is not within a specified distance of an allowable codeword.

Figure 9:
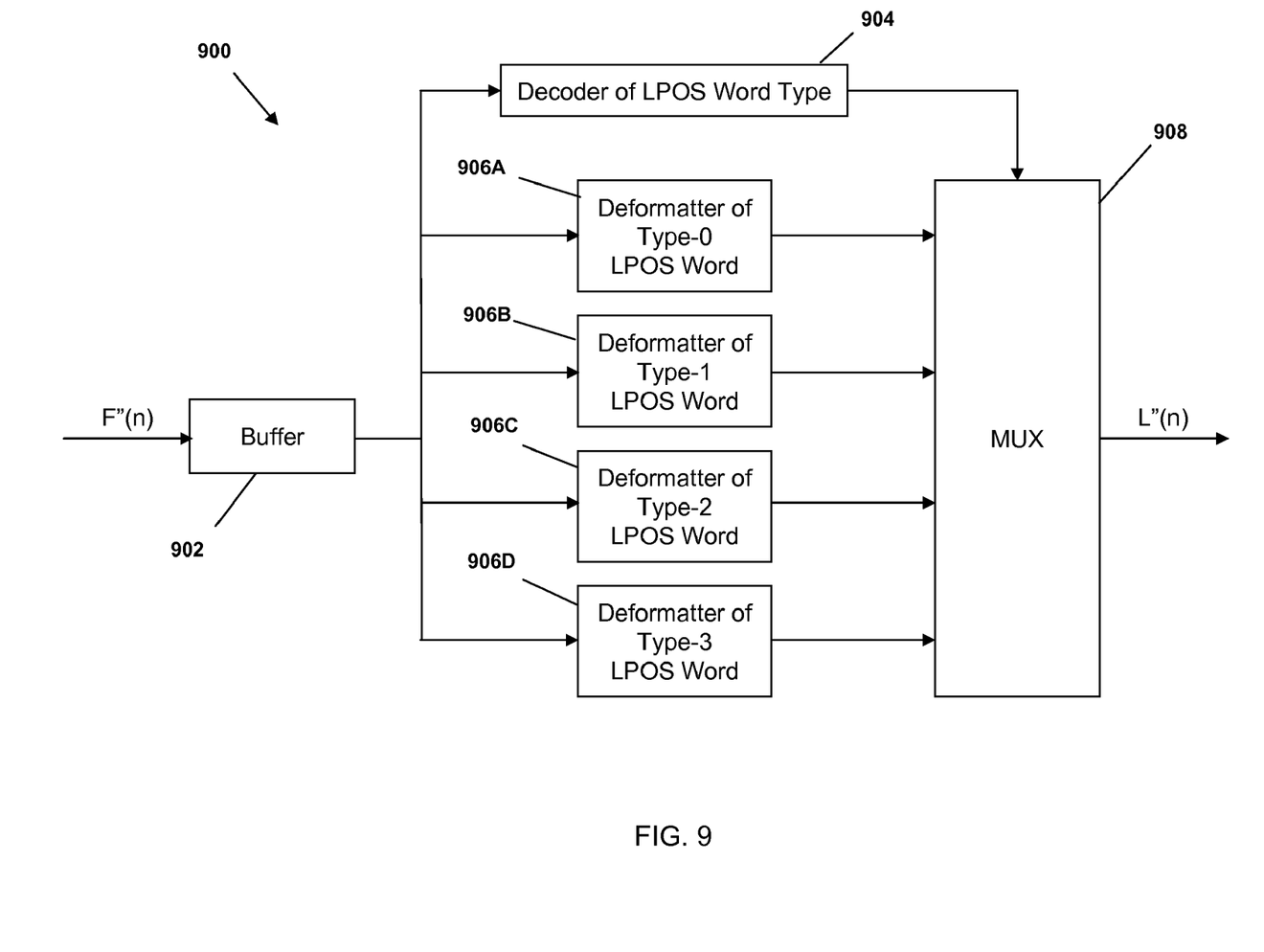
FIG. 9 is a block diagram of an implementation of a sliding-block deformatter in accordance with the present invention.

The deformatter 900 processes the newly input F"(n) together with the three immediately preceding inputs F"(n−1), F"(n−2) and F"(n−3), stored in a buffer. The deformatter 800 then outputs the original position symbols L"(n)=L$_0$(n), L$_1$(n), L$_2$(n), L$_3$(n), L$_4$(n), L$_5$(n) in the absence of errors at the input of the deformatter 800. Errors at the input of the deformatter 800 may be detected if L"(n−1) and L"(n) are not consecutive. FIG. 9 is a block diagram of the deformatter 900. The deformatter 900 includes a buffer 902, in which the current and three immediately preceding inputs are stored, and a decoder 904, which decodes which of the four word type the current symbols represent. The deformatter 900 also includes four deformatter modules 906A, 906B, 906C, 906D, each dedicated to deformatting a different word type. The output of the word type deformatter 904 controls a multiplexer 908 which selects the output of the appropriate deformatter module 906A, 906B, 906C, 906D as the output L"(n).

Figure 10:
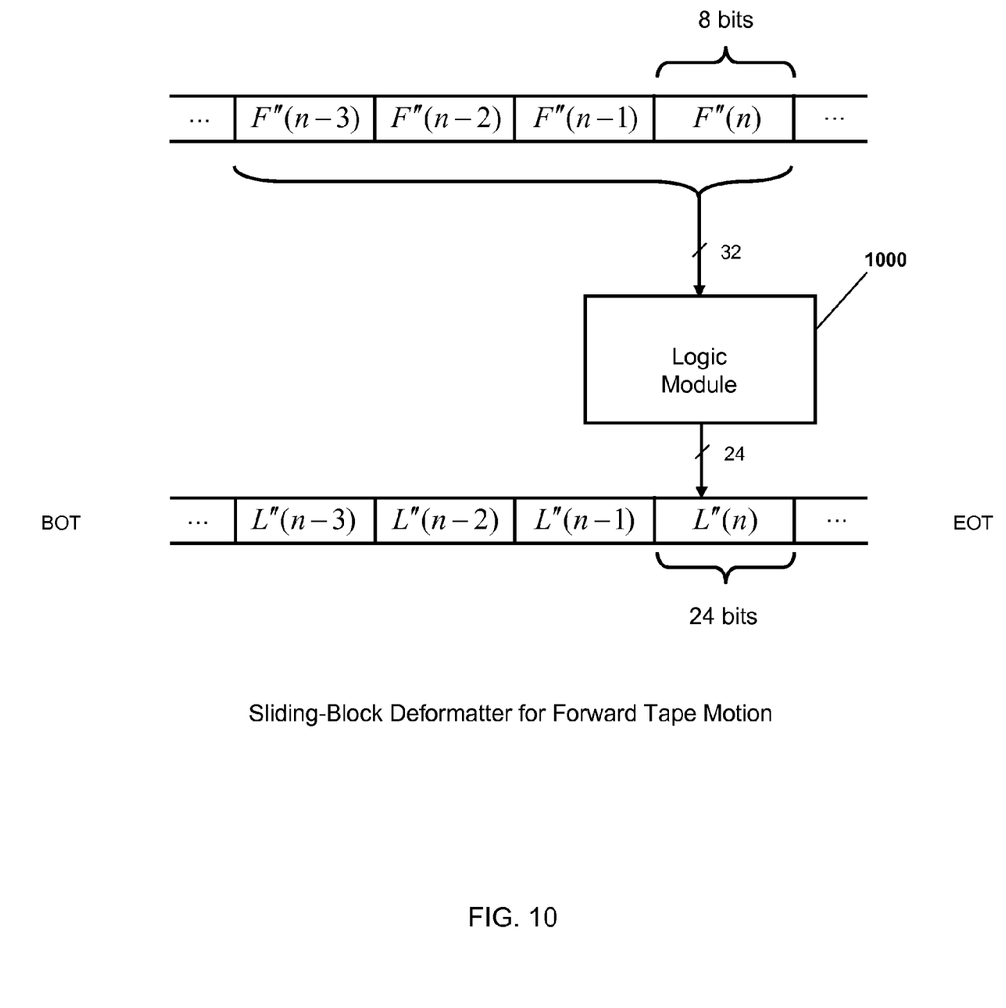
FIG. 10 illustrates a sliding-block deformatter of the present invention for forward tape motion.

FIG. 10 illustrates the manner in which the block deformatter 900 maps the 32 input bits into the 24-bit LPOS word L'(n) when the tape 200 is moving in the forward direction. In the forward tape motion, the LPOS is incremented by 1 and the functional dependency of L"(n) on F"(n), F"(n−1), F"(n−2) and F"(n−3) is described by the equation L"(n)=f$_{forward}$(F"(n−3), F"(n−2), F"(n−1), F"(n)) where F"(n−3) is decoded first in time, F"(n−2) is decoded second in time, F"(n−1) is decoded third in time and F"(n) is decoded last in time. A detailed description of this functional relationship in terms of pseudocode is provided below. A logic module 1000 performs the mapping function as:

$$L''(n) = f_{forward}(F''(n-3), F''(n-2), F''(n-1), F''(n)) \text{ where } F''(n) = F''0(n), F''1(n).$$

Figure 11:
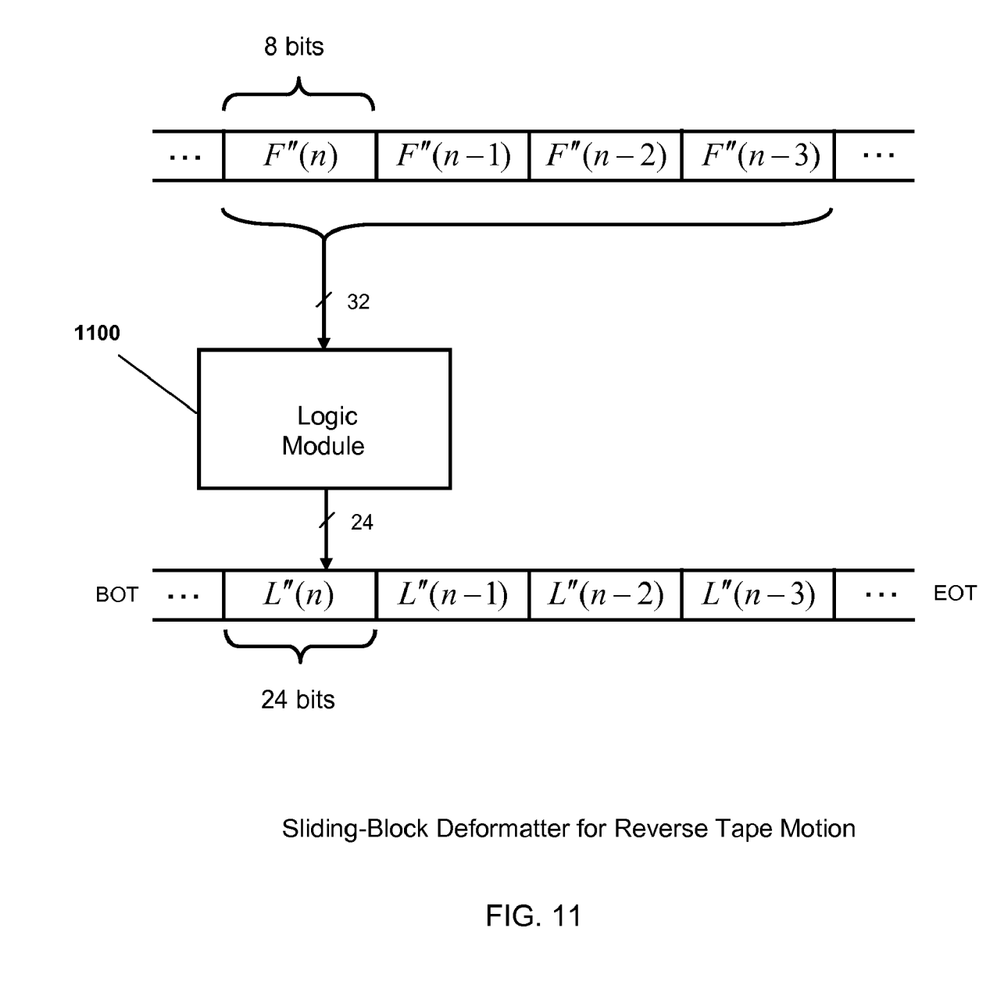
FIG. 11 illustrates a sliding-block deformatter of the present invention for reverse tape motion.

FIG. 11 illustrates the manner in which the block deformatter 900 maps the 32 input bits into the 24-bit LPOS word L'(n) when the tape 200 is moving in the reverse direction. In the reverse tape motion, the LPOS is decremented by 1 and the functional dependency of L"(n) on F"(n), F"(n−1), F"(n−2) and F"(n−3) is described by the equation L"(n)=f$_{reverse}$(F"(n−3), F"(n−2), F"(n−1), F"(n)) where F"(n−3) is decoded first in time, F"(n−2) is decoded second in time, F"(n−1) is decoded third in time and F"(n) is decoded last in time. A logic module 1100 performs the mapping function as:

$$L''(n) = f_{reverse}(F''(n-3), F''(n-2), F''(n-1), F''(n)) \text{ where } F''(n) = F''0(n), F''1(n).$$

The relationship between f$_{forward}$ and f$_{reverse}$ may be described as:

$$L''(n) = f_{reverse}(F''(n-3), F''(n-2), F''(n-1), F''(n)) = L''(n-3) - 3 = f_{forward}(F''(n), F''(n-1), F''(n-2), F''(n-3)) - 3,$$

where F"(n−3)=S1 is decoded first in time, F"(n−2)=S2 is decoded second in time, F"(n−1)=S3 is decoded third in time and F"(n)=S4 is decoded last in time during reverse tape motion. Note that in the forward tape motion, the symbols decoded during reverse tape motion would have been decoded in reverse order, that is, S4 would have been decoded first in time, S3 would have been decoded second in time, S2 would have been decoded third in time and S1 would have been decoded last in time.

Thus, the forward-direction sliding-block deformatter in conjunction with subtraction of 3 from the resulting LPOS value may be used as the reverse-direction sliding-block deformatter. The arguments of f$_{forward}$ in this case must be in reverse order.

The following is an example of pseudocode in which the deformatter 900 is implemented as a forward-direction sliding block deformatter. It is convenient to drop the current time n and use the variables Fjk that stand for the formatted symbols F"$_j$(n−k). First, the word type is decoded:

```
Function DecodeType(F00, F01, F02 As Integer) As Integer
Dim A, B, C, D, E, F, G, H, J As Boolean; Dim WordType As Integer
A = B = C = D = E = F = G = H = J = False
  Select Case (F00 − F02 + 14) Mod 14
    Case 0
      B = True
    Case 1
      J = True
    Case 2
      A = True
  End Select
  Select Case ((F00 − 1 + 14) Mod 14) Mod 4
    Case 1
      C = True
    Case 3
      D = True
  End Select
  Select Case ((F01 + 1) Mod 14) Mod 4
    Case 1
      E = True
    Case 3
      F = True
  End Select
  If (F01 Mod 2) = 0 Then G = True End If
    If (F00 Mod 2) = 0 Then H = True End If
  If (A And G And D) Or (A And (Not G) And C) Then
    DecodeType = 0
  ElseIf (B Or J) And ((H And E) Or ((Not H) And F)) Then
    DecodeType = 1
  ElseIf (A And G And C) Or (A And (Not G) And D) Then
    DecodeType = 2
  ElseIf ((B Or J) And H And F) Or ((B Or J) And (Not H) And E) Then
    DecodeType = 3
  End If
End Function
```

Next, L0 through L5 are decoded in succession:

```
Function DecodeL0(F00, F01, WordType As Integer)
    Select Case WordType
        Case 0, 2
            DecodeL0 = F00
        Case 1, 3
            DecodeL0 = (F01 + 1) Mod 14
    End Select
End Function
Function DecodeL1(F00, F01, WordType, L0 As Integer)
    Select Case WordType
        Case 0, 2
            If L0 = 0 Then
                DecodeL1 = (F01 + 1) Mod 14
            Else
                DecodeL1 = F01
            End If
        Case 1, 3
            DecodeL1 = F00
    End Select
End Function
Function DecodeL2(F10, F11, F12, F13, WordType, L0, L1 As Integer)
    Select Case WordType
        Case 0
            DecodeL2 = F10
        Case 1
            If (L0 = 0) And (L1 = 0) Then
                DecodeL2 = (F11 + 1) Mod 14
            Else
                DecodeL2 = F11
            End If
        Case 2
            If (L0 < 2) And (L1 = 0) Then
                DecodeL2 = (F12 + 1) Mod 14
            Else
                DecodeL2 = F12
            End If
        Case 3
            If (L0 < 3) And (L1 = 0) Then
                DecodeL2 = (F13 + 1) Mod 14
            Else
                DecodeL2 = F13
            End If
    End Select
End Function
Function DecodeL3(F10, F11, F12, F13, WordType, L0, L1, L2
As Integer)
    Select Case WordType
        Case 0
            If (L0 < 3) And (L1 = 0) And (L2 = 0) Then
                DecodeL3 = (F13 + 1) Mod 14
            Else
                DecodeL3 = F13
            End If
        Case 1
            DecodeL3 = F10
        Case 2
            If (L0 = 0) And (L1 = 0) And (L2 = 0) Then
                DecodeL3 = (F11 + 1) Mod 14
            Else
                DecodeL3 = F11
            End If
        Case 3
            If (L0 < 2) And (L1 = 0) And (L2 = 0) Then
                DecodeL3 = (F12 + 1) Mod 14
            Else
                DecodeL3 = F12
            End If
    End Select
End Function
Function DecodeL4(F10, F11, F12, F13, WordType, L0, L1, L2, L3 As
Integer)
    Select Case WordType
        Case 0
            If (L0 < 2) And (L1 = 0) And (L2 = 0) And (L3 = 0) Then
                DecodeL4 = (F12 + 1) Mod 14
            Else
                DecodeL4 = F12
            End If
        Case 1
            If (L0 < 3) And (L1 = 0) And (L2 = 0) And (L3 = 0) Then
                DecodeL4 = (F13 + 1) Mod 14
            Else
                DecodeL4 = F13
            End If
        Case 2
            DecodeL4 = F10
        Case 3
            If (L0 = 0) And (L1 = 0) And (L2 = 0) And (L3 = 0) Then
                DecodeL4 = (F11 + 1) Mod 14
            Else
                DecodeL4 = F11
            End If
    End Select
End Function
Function DecodeL5(F10, F11, F12, F13, WordType, L0, L1, L2, L3,
L4 As Integer)
    Select Case WordType
        Case 0
            If (L0 = 0) And (L1 = 0) And (L2 = 0) And (L3 = 0)
            And (L4 = 0) Then
                DecodeL5 = (F11 + 1) Mod 14
            Else
                DecodeL5 = F11
            End If
        Case 1
            If (L0 < 2) And (L1 = 0) And (L2 = 0) And (L3 = 0)
            And (L4 = 0) Then
                DecodeL5 = (F12 + 1) Mod 14
            Else
                DecodeL5 = F12
            End If
        Case 2
            If (L0 < 3) And (L1 = 0) And (L2 = 0) And (L3 = 0)
            And (L4 = 0) Then
                DecodeL5 = (F13 + 1) Mod 14
            Else
                DecodeL5 = F13
            End If
        Case 3
            DecodeL5 = F10
    End Select
End Function
```

Thus, the present invention adds redundancy to LPOS words to provide the capability of correcting multiple bit errors without increasing the LPOS word length.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies regardless of the particular type of signal bearing media actually used to carry out the distribution. Examples of computer readable media include recordable-type storage media such as a floppy disk, a hard disk drive, a RAM, and CD-ROMs and other storage media.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Moreover, although described above with respect to methods and systems, the need in the art may also be met with a computer program product containing instructions for providing error correction capability to a longitudinal position (LPOS) word in a tape storage system or a method for deploying computing infrastructure comprising integrating computer readable code into a computing system for providing error correction capability to a longitudinal position (LPOS) word in a tape storage system.

What is claimed is:

1. A method for encoding a longitudinal position (LPOS) word L(n) with error correction capability, the LPOS word having a plurality of LPOS symbols L0(n) through Lk(n) calculated as $$L(n) = \sum_{i=0}^{5} L_i(n) 14^i$$

and representing a longitudinal position of a magnetic tape relative to a tape head in a tape storage system, the method comprising:

determining a word type in response to at least one of the plurality of LPOS symbols;

in response to the determined word type, generating at least one formatted symbol F(n) from the plurality of LPOS symbols L(n);

generating at least one parity symbol P(n) from the formatted symbol F(n); and communicating LPOS data to a servo channel of the tape storage system to be recorded onto a servo track of the magnetic tape, the LPOS data comprising the at least one formatted symbol F(n) and the at least one parity symbol P(n).

2. The method of claim 1, wherein:

the LPOS word comprises an 8-bit sync symbol Sy, six 4-bit position symbols, L(n)=L0(n), L1(n), L2(n), L3(n), L4(n), L5(n), and one 4-bit manufacturer's symbol T(n);

generating the at least one formatted symbol F(n) comprises generating two formatted symbols F0(n), F1(n);

generating the at least one parity symbol P(n) comprises generating four parity symbols V(n), W(n), X(n), Y(n) from the six 4-bit position symbols; and communicating the LPOS data further comprises communicating one of four encoded words to the servo channel, the four words comprising:

a Type 0 LPOS word comprising Sy, V(n), W(n), X(n), Y(n), L0(n), L2(n), T(n) if (14 L1(n)+L0(n))=0 mod 4;

a Type 1 LPOS word comprising Sy, V(n+1), W(n+1), X(n+1), Y(n+1), L1(n+1), L3(n+1), T(n+1) if (14 L1(n+1)+L0(n+1))=1 mod 4;

a Type 2 LPOS word comprising Sy, V(n+2), W(n+2), X(n+2), Y(n+2), L0(n+2), L4(n+2), T(n+2) if (14 L1(n+2)+L0(n+2))=2 mod 4; and a Type 3 LPOS word comprising Sy, V(n+3), W(n+3), X(n+3), Y(n+3), L1(n+3), L5(n+3), T(n+3) if (14 L1(n+3)+L0(n+3))=3 mod 4.

3. The method of claim 1, wherein:

the LPOS word comprises an 8-bit sync symbol Sy, six 4-bit position symbols, L(n)=L0(n), L1(n), L2(n), L3(n), L4(n), L5(n), and one 4-bit manufacturer's symbol T(n);

generating the at least one formatted symbol F(n) comprises generating two formatted symbols F0(n), F1(n);

generating the at least one parity symbol P(n) comprises generating two parity symbols X(n), Y(n) from the six 4-bit position symbols; and communicating the LPOS data further comprises communicating one of four encoded words to the servo channel, the four words comprising:

a Type 0 LPOS word comprising Sy, X(n), Y(n), L0(n), L2(n), T(n) if (14 L1(n)+L0(n))=0 mod 4;

a Type 1 LPOS word comprising Sy, X(n+1), Y(n+1), L1(n+1), L3(n+1), T(n+1) if (14 L1(n+1)+L0(n+1))=1 mod 4;

a Type 2 LPOS word comprising Sy, X(n+2), Y(n+2), L0(n+2), L4(n+2), T(n+2) if (14 L1(n+2)+L0(n+2))=2 mod 4; and a Type 3 LPOS word comprising Sy, X(n+3), Y(n+3), L1(n+3), L5(n+3), T(n+3) if (14 L1(n+3)+L0(n+3))=3 mod 4.

4. The method of claim 1, wherein generating the at least one parity symbol P(n) comprises generating the at least one parity symbol P(n) from the six 4-bit position symbols L(n) and the one 4-bit manufacturer's symbol T(n).

5. A method for decoding an encoded longitudinal position (LPOS) word L(n) recorded on a magnetic tape and representing a longitudinal position of the magnetic tape relative to a tape head in a tape storage system, the method comprising:

reproducing the recorded encoded LPOS word from the magnetic tape, including a reproduced formatted symbol F(n) and at least one reproduced parity symbol P(n); and decoding the encoded LPOS word by:

generating at least one decoded symbol F"(n) from the at least one reproduced parity symbol P(n) and the at least one reproduced formatted symbol F(n);

raising an error-detection flag if an uncorrectable error is detected during the generation of the at least one decoded symbol F"(n); and if no error-detection flag is raised during the generation of the at least one decoded symbol F"(n):

determining a word type of the encoded LPOS word; and in response to the determined word type, generating a deformatted LPOS word L"(n) representing the longitudinal position of the magnetic tape relative to the tape head.

6. The method of claim 5, wherein:

the LPOS word comprises an 8-bit sync symbol Sy, six 4-bit position symbols, L(n)=L0(n), L1(n), L2(n), L3(n), L4(n), L5(n), and one 4-bit manufacturer's symbol T(n);

the at least one formatted symbol F(n) comprises two formatted symbols F0(n), F1(n);

the at least one parity symbol P(n) comprises four parity symbols V(n), W(n), X(n), Y(n);

a Type 0 LPOS word comprises Sy, V(n), W(n), X(n), Y(n), L0(n), L2(n), T(n) if (14 L1(n)+L0(n))=0 mod 4;

a Type 1 LPOS word comprises Sy, V(n+1), W(n+1), X(n+1), Y(n+1), L1(n+1), L3(n+1), T(n+1) if (14 L1(n+1)+L0(n+1))=1 mod 4;

a Type 2 LPOS word comprises Sy, V(n+2), W(n+2), X(n+2), Y(n+2), L0(n+2), L4(n+2), T(n+2) if (14 L1(n+2)+L0(n+2))=2 mod 4; and a Type 3 LPOS word comprises Sy, V(n+3), W(n+3), X(n+3), Y(n+3), L1(n+3), L5(n+3), T(n+3) if (14 L1(n+3)+L0(n+3))=3 mod 4.

7. The method of claim 5, wherein:
the LPOS word comprises an 8-bit sync symbol Sy, six 4-bit position symbols, L(n)=L0(*n*), L1(*n*), L2(*n*), L3(*n*), L4(*n*), L5(*n*), and one 4-bit manufacturer's symbol T(n);
the at least one formatted symbol F(n) comprises two formatted symbols F0(*n*), F1(*n*);
the at least one parity symbol P(n) comprises two parity symbols X(n), Y(n); and
a Type 0 LPOS word comprises Sy, X(n), Y(n), L0(*n*), L2(*n*), T(n) if (14 L1(*n*)+L0(*n*))=0 mod 4;
a Type 1 LPOS word comprises Sy, X(n+1), Y(n+1), L1(*n*+1), L3(*n*+1), T(n+1) if (14 L1(*n*+1)+L0(*n*+1))=1 mod 4;
a Type 2 LPOS word comprises Sy, X(n+2), Y(n+2), L0(*n*+2), L4(*n*+2), T(n+2) if (14 L1(*n*+2)+L0(*n*+2))=2 mod 4; and
a Type 3 LPOS word comprises Sy, X(n+3), Y(n+3), L1(*n*+3), L5(*n*+3), T(n+3) if (14 L1(*n*+3)+L0(*n*+3))=3 mod 4.

8. The method of claim 5, wherein generating the deformatted LPOS word L"(n) comprises:
storing the current and the previous three decoded formatted symbols F"(n), F"(n−1), F"(n−2), F"(n−3) in a buffer; and
applying the current and previous three decoded formatted symbols F"(n), F"(n−1), F"(n−2), F"(n−3) to a sliding block deformatter.

9. An encoder operable to encode an longitudinal position (LPOS) word with error correction capability, an LPOS word L(n) having a plurality of LPOS symbols L0(*n*) through Lk(n) calculated as $$L(n) = \sum_{i=0}^{5} L_i(n)14^i,$$

the LPOS word representing a longitudinal position of a magnetic tape relative to a tape head, the encoder comprising:
a word type generator operable to determine a word type in response to at least one of the plurality of LPOS symbols;
a format symbol generator operable to generate at least one formatted symbol F(n) from the plurality of LPOS symbols L(n) in response to the determined word type;
a parity symbol generator operable to generate at least one parity symbol P(n) from the formatted symbol F(n); and
a servo channel operable to transmit LPOS data to be recorded onto a servo track of the magnetic tape, the LPOS data comprising the at least one formatted symbol F(n) and the at least one parity symbol P(n).

10. The encoder of claim 9, wherein the LPOS word comprises an 8-bit sync symbol Sy, six 4-bit position symbols, L(n)=L0(*n*), L1(*n*), L2(*n*), L3(*n*), L4(*n*), L5(*n*), and one 4-bit manufacturer's symbol T(n), and wherein:
the format symbol generator is operable to generate two formatted symbols F0(*n*), F1(*n*);
the parity symbol generator is operable to generate four parity symbols V(n), W(n), X(n), Y(n) from the six 4-bit position symbols; and
the means for transmitting the LPOS data further comprises means for transmitting one of four encoded words to the servo channel, the four words comprising:
a Type 0 LPOS word comprising Sy, V(n), W(n), X(n), Y(n), L0(*n*), L2(*n*), T(n) if (14 L1(*n*)+L0(*n*))=0 mod 4;
a Type 1 LPOS word comprising Sy, V(n+1), W(n+1), X(n+1), Y(n+1), L1(*n*+1), L3(*n*+1), T(n+1) if (14 L1(*n*+1)+L0(*n*+1))=1 mod 4;
a Type 2 LPOS word comprising Sy, V(n+2), W(n+2), X(n+2), Y(n+2), L0(*n*+2), L4(*n*+2), T(n+2) if (14 L1(*n*+2)+L0(*n*+2))=2 mod 4; and
a Type 3 LPOS word comprising Sy, V(n+3), W(n+3), X(n+3), Y(n+3), L1(*n*+3), L5(*n*+3), T(n+3) if (14 L1(*n*+3)+L0(*n*+3))=3 mod 4.

11. The encoder of claim 9, wherein the LPOS word comprises an 8-bit sync symbol Sy, six 4-bit position symbols, L(n)=L0(*n*), L1(*n*), L2(*n*), L3(*n*), L4(*n*), L5(*n*), and one 4-bit manufacturer's symbol T(n), and wherein:
the format symbol generator is operable to generate two formatted symbols F0(*n*), F1(*n*);
the parity symbol generator is operable to generate two parity symbols X(n), Y(n) from the six 4-bit position symbols; and
the means for transmitting the LPOS data further comprises means for transmitting one of four encoded words to the servo channel, the four words comprising:
a Type 0 LPOS word comprising Sy, X(n), Y(n), L0(*n*), L2(*n*), T(n) if (14 L1(*n*)+L0(*n*))=0 mod 4;
a Type 1 LPOS word comprising Sy, X(n+1), Y(n+1), L1(*n*+1), L3(*n*+1), T(n+1) if (14 L1(*n*+1)+L0(*n*+1))=1 mod 4;
a Type 2 LPOS word comprising Sy, X(n+2), Y(n+2), L0(*n*+2), L4(*n*+2), T(n+2) if (14 L1(*n*+2)+L0(*n*+2))=2 mod 4; and
a Type 3 LPOS word comprising Sy, X(n+3), Y(n+3), L1(*n*+3), L5(*n*+3), T(n+3) if (14 L1(*n*+3)+L0(*n*+3))=3 mod 4.

12. The encoder of claim 9, wherein the parity symbol generator is further operable to generate the at least one parity symbol P(n) from the six 4-bit position symbols L(n) and the one 4-bit manufacturer's symbol T(n).

13. A tape storage system having error correction capability for longitudinal position (LPOS) words, an LPOS word L(n) having a plurality of LPOS symbols L0(*n*) through Lk(n) calculated as $$L(n) = \sum_{i=0}^{5} L_i(n)14^i,$$

the LPOS word representing a longitudinal position of a magnetic tape relative to a tape head, the system comprising:
a servo channel operable to reproduce a recorded encoded LPOS word, including a reproduced formatted symbol F(n) and at least one reproduced parity symbol P(n), from the magnetic tape; and
a decoder operable to decode the encoded LPOS word, comprising:
a decoder operable to generate at least one decoded symbol F"(n) from the least one reproduced parity symbol P(n) and the formatted symbol F(n);
a word type decoder operable to determine the word type of the encoded LPOS word; and
a deformatter operable to generate a deformatted LPOS word L"(n) representing the longitudinal position of the magnetic tape relative to the tape head in response to the determined word type.

14. The system of claim 13, wherein the LPOS word comprises an 8-bit sync symbol Sy, six 4-bit position symbols, $L(n)=L0(n), L1(n), L2(n), L3(n), L4(n), L5(n)$, and one 4-bit manufacturer's symbol $T(n)$, and wherein:

the at least one formatted symbol $F(n)$ comprises two formatted symbols $F0(n), F1(n)$;

the at least one parity symbol comprises four parity symbols $V(n), W(n), X(n), Y(n)$;

a Type 0 LPOS word comprises Sy, $V(n), W(n), X(n), Y(n), L0(n), L2(n), T(n)$ if $(14\,L1(n)+L0(n))=0 \bmod 4$;

a Type 1 LPOS word comprises Sy, $V(n+1), W(n+1), X(n+1), Y(n+1), L1(n+1), L3(n+1), T(n+1)$ if $(14\,L1(n+1)+L0(n+1))=1 \bmod 4$;

a Type 2 LPOS word comprises Sy, $V(n+2), W(n+2), X(n+2), Y(n+2), L0(n+2), L4(n+2), T(n+2)$ if $(14\,L1(n+2)+L0(n+2))=2 \bmod 4$; and a Type 3 LPOS word comprises Sy, $V(n+3), W(n+3), X(n+3), Y(n+3), L1(n+3), L5(n+3), T(n+3)$ if $(14\,L1(n+3)+L0(n+3))=3 \bmod 4$.

15. The system of claim 13, wherein the LPOS word comprises an 8-bit sync symbol Sy, six 4-bit position symbols, $L(n)=L0(n), L1(n), L2(n), L3(n), L4(n), L5(n)$, and one 4-bit manufacturer's symbol $T(n)$, and wherein:

the at least one formatted symbol $F(n)$ comprises two formatted symbols $F0(n), F1(n)$;

the at least one parity symbol comprises two parity symbols $X(n), Y(n)$ from the six 4-bit position symbols;

a Type 0 LPOS word comprises Sy, $X(n), Y(n), L0(n), L2(n), T(n)$ if $(14\,L1(n)+L0(n))=0 \bmod 4$;

a Type 1 LPOS word comprises Sy, $X(n+1), Y(n+1), L1(n+1), L3(n+1), T(n+1)$ if $(14\,L1(n+1)+L0(n+1))=1 \bmod 4$;

a Type 2 LPOS word comprises Sy, $X(n+2), Y(n+2), L0(n+2), L4(n+2), T(n+2)$ if $(14\,L1(n+2)+L0(n+2))=2 \bmod 4$; and a Type 3 LPOS word comprises Sy, $X(n+3), Y(n+3), L1(n+3), L5(n+3), T(n+3)$ if $(14\,L1(n+3)+L0(n+3))=3 \bmod 4$.

16. The system of claim 13, wherein the deformatter comprises:

a buffer operable to store the current and the previous three decoded formatted symbols $F''(n), F''(n-1), F''(n-2), F''(n-3)$ in a buffer; and a sliding block deformatter to which the current and previous three decoded formatted symbols $F''(n), F''(n-1), F''(n-2), F''(n-3)$ are applied.

17. The system of claim 16, wherein the sliding block deformatter comprises a sliding block deformatter for each word type.

18. A computer program product of a computer readable medium usable with a programmable computer, the computer program product having computer-readable code embodied therein for decoding an encoded longitudinal position (LPOS) word $L(n)$ recorded on a magnetic tape and representing a longitudinal position of the magnetic tape relative to a tape head in a tape storage system, the computer-readable code comprising instructions for:

reproducing the recorded encoded LPOS word from the magnetic tape, including a reproduced formatted symbol $F(n)$ and at least one reproduced parity symbol $P(n)$; and decoding the encoded LPOS word by:

generating at least one decoded symbol $F''(n)$ from the at least one reproduced parity symbol $P(n)$ and the at least one reproduced formatted symbol $F(n)$;

raising an error-detection flag if an uncorrectable error is detected during the generation of the at least one decoded symbol $F''(n)$; and if no error-detection flag is raised during the generation of the at least one decoded symbol $F''(n)$:

determining a word type of the encoded LPOS word; and in response to the determined word type, generating a deformatted LPOS word $L''(n)$ representing the longitudinal position of the magnetic tape relative to the tape head.

19. The computer program product of claim 18, wherein:

the LPOS word comprises an 8-bit sync symbol Sy, six 4-bit position symbols, $L(n)=L0(n), L1(n), L2(n), L3(n), L4(n), L5(n)$, and one 4-bit manufacturer's symbol $T(n)$;

the at least one formatted symbol $F(n)$ comprises two formatted symbols $F0(n), F1(n)$;

the at least one parity symbol $P(n)$ comprises four parity symbols $V(n), W(n), X(n), Y(n)$;

a Type 0 LPOS word comprises Sy, $V(n), W(n), X(n), Y(n), L0(n), L2(n), T(n)$ if $(14\,L1(n)+L0(n))=0 \bmod 4$;

a Type 1 LPOS word comprises Sy, $V(n+1), W(n+1), X(n+1), Y(n+1), L1(n+1), L3(n+1), T(n+1)$ if $(14\,L1(n+1)+L0(n+1))=1 \bmod 4$;

a Type 2 LPOS word comprises Sy, $V(n+2), W(n+2), X(n+2), Y(n+2), L0(n+2), L4(n+2), T(n+2)$ if $(14\,L1(n+2)+L0(n+2))=2 \bmod 4$; and a Type 3 LPOS word comprises Sy, $V(n+3), W(n+3), X(n+3), Y(n+3), L1(n+3), L5(n+3), T(n+3)$ if $(14\,L1(n+3)+L0(n+3))=3 \bmod 4$.

20. The computer program product of claim 18, wherein:

the LPOS word comprises an 8-bit sync symbol Sy, six 4-bit position symbols, $L(n)=L0(n), L1(n), L2(n), L3(n), L4(n), L5(n)$, and one 4-bit manufacturer's symbol $T(n)$;

the at least one formatted symbol $F(n)$ comprises two formatted symbols $F0(n), F1(n)$;

the at least one parity symbol $P(n)$ comprises two parity symbols $X(n), Y(n)$; and a Type 0 LPOS word comprises Sy, $X(n), Y(n), L0(n), L2(n), T(n)$ if $(14\,L1(n)+L0(n))=0 \bmod 4$;

a Type 1 LPOS word comprises Sy, $X(n+1), Y(n+1), L1(n+1), L3(n+1), T(n+1)$ if $(14\,L1(n+1)+L0(n+1))=1 \bmod 4$;

a Type 2 LPOS word comprises Sy, $X(n+2), Y(n+2), L0(n+2), L4(n+2), T(n+2)$ if $(14\,L1(n+2)+L0(n+2))=2 \bmod 4$; and a Type 3 LPOS word comprises Sy, $X(n+3), Y(n+3), L1(n+3), L5(n+3), T(n+3)$ if $(14\,L1(n+3)+L0(n+3))=3 \bmod 4$.

21. The computer program product of claim 18, wherein the instructions for generating the deformatted LPOS word $L''(n)$ comprise instructions for:

storing the current and the previous three decoded formatted symbols $F''(n), F''(n-1), F''(n-2), F''(n-3)$ in a buffer; and applying the current and previous three decoded formatted symbols $F''(n), F''(n-1), F''(n-2), F''(n-3)$ to a sliding block deformatter.

* * * * *